United States Patent
Suzuki

(10) Patent No.: US 11,046,361 B2
(45) Date of Patent: Jun. 29, 2021

(54) ASSISTING FORCE CONTROL DEVICE AND ASSISTING FORCE CONTROL METHOD

(71) Applicant: ISUZU MOTORS LIMITED, Tokyo (JP)

(72) Inventor: Teruhiko Suzuki, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 231 days.

(21) Appl. No.: 16/322,441

(22) PCT Filed: Jul. 31, 2017

(86) PCT No.: PCT/JP2017/027621
§ 371 (c)(1),
(2) Date: Jan. 31, 2019

(87) PCT Pub. No.: WO2018/025791
PCT Pub. Date: Feb. 8, 2018

(65) Prior Publication Data
US 2020/0247460 A1    Aug. 6, 2020

(30) Foreign Application Priority Data

Aug. 2, 2016   (JP) .............................. JP2016-152057

(51) Int. Cl.
*B62D 5/04*        (2006.01)
*B62D 6/02*        (2006.01)
(Continued)

(52) U.S. Cl.
CPC ............. *B62D 5/0463* (2013.01); *B62D 6/02* (2013.01); *B62D 6/10* (2013.01); *B62D 15/025* (2013.01)

(58) Field of Classification Search
CPC .......... B62D 5/0463; B62D 6/02; B62D 6/10; B62D 6/00; B62D 15/025; B62D 1/286
See application file for complete search history.

(56) References Cited

U.S. PATENT DOCUMENTS 6,212,452 B1    4/2001 Shimizu et al.
8,577,553 B2 *  11/2013 Nitta .................... B60W 50/045
                                                                701/42
(Continued)

FOREIGN PATENT DOCUMENTS

EP         2955080 A1    12/2015
JP       H11-078936 A     3/1999
(Continued)

OTHER PUBLICATIONS

International Search Report and Written Opinion for related International Application No. PCT/JP2017/027621 dated Oct. 10, 2017; English translation of ISR provided; 6 pages.
(Continued)

*Primary Examiner* — Michael J Zanelli
(74) *Attorney, Agent, or Firm* — Procopio, Cory, Hargreaves & Savitch LLP

(57) ABSTRACT

An assisting force control device 1 includes a torque detection unit that detects the steering torque of a vehicle, a calculation unit that, after the torque detection unit has detected a steering torque of at least a prescribed size, integrates the steering torque to calculate an integrated torque amount, and an assisting force control unit that reduces the steering assisting force to a value that is smaller than a prescribed value in a direction in which the vehicle is prevented from deviating from a lane, such reduction carried out if the integrated torque amount calculated by the calculation unit becomes at least an integration threshold value corresponding to a traveling condition of the vehicle.

6 Claims, 4 Drawing Sheets

(51) Int. Cl.
*B62D 6/10* (2006.01)
*B62D 15/02* (2006.01)

(56) References Cited

U.S. PATENT DOCUMENTS

| | | | |
|---|---|---|---|
| 8,738,229 B2 * | 5/2014 | Tamaizumi | B62D 5/0463 |
| | | | 701/41 |
| 9,994,253 B2 * | 6/2018 | Okuda | B62D 15/021 |
| 2005/0267661 A1 | 12/2005 | Iwazaki et al. | |
| 2009/0240389 A1 | 9/2009 | Nomura et al. | |
| 2011/0251758 A1 | 10/2011 | Kataoka | |
| 2015/0353125 A1 | 12/2015 | Tsubaki | |
| 2016/0176400 A1 | 6/2016 | Nakano et al. | |
| 2018/0186372 A1 * | 7/2018 | Shimizu | B60W 50/085 |

FOREIGN PATENT DOCUMENTS

| | | |
|---|---|---|
| JP | 2005-343184 A | 12/2005 |
| JP | 2009-214680 A | 9/2009 |
| JP | 2012-011862 A | 1/2012 |
| JP | 2013-242727 A | 12/2013 |
| JP | 2015-020719 A | 2/2015 |
| JP | 2015-205558 A | 11/2015 |
| WO | 2007/139030 A1 | 12/2007 |
| WO | 2014/119359 A1 | 8/2014 |

OTHER PUBLICATIONS

Extended European Search Report for related EP App No. 17836896.5 dated Jul. 5, 2019, 8 pgs.

\* cited by examiner

ASSISTING FORCE CONTROL DEVICE AND ASSISTING FORCE CONTROL METHOD

CROSS-REFERENCE TO RELATED APPLICATIONS

This application is a U.S. National Stage entry of PCT Application No: PCT/JP2017/027621 filed on Jul. 31, 2017, which claims priority to Japanese Patent Application No. 2016-152057 filed on Aug. 2, 2016, the contents of which are incorporated herein by reference.

TECHNICAL FIELD

The present disclosure relates to an assistance force control device and an assistance force control method for controlling a steering assistance force of a vehicle.

BACKGROUND ART

In order to prevent a vehicle traveling on a road from deviating from a lane, a technique of generating a steering reaction force so as to prevent deviation of a vehicle is known. Patent Literature 1 discloses a technique of recognizing that a driver is intentionally changing the lane and stops generating a steering reaction force when a steering torque of equal to or greater than a predetermined magnitude continues for equal to or greater than a predetermined time.

CITATION LIST

Patent Document

Patent Literature 1: JP-A-2015-205558

SUMMARY OF THE INVENTION

Technical Problem

A magnitude of a steering torque required to move a vehicle in a left-right direction by a predetermined amount varies depending on a travel condition of the vehicle. For example, in a case where the vehicle is heavy in weight or in a case where a travel speed of the vehicle is high, the steering torque required to move the vehicle by the predetermined amount increases. In the related art, since it is not considered that the steering torque changes depending on the travel condition of the vehicle, there is a problem that an accuracy of determining whether or not the driver is intentionally changing the lane is low.

The disclosure has been made in view of these problems, and an object thereof is to improve the accuracy of determining whether or not a driver is intentionally changing a lane.

Solution to Problem

An assistance force control device according to a first aspect of the disclosure includes:
a torque detection unit configured to detect a steering torque of a vehicle;
a calculation unit configured, after the torque detection unit detects a steering torque equal to or greater than a predetermined magnitude, to integrate the steering torque to calculate an integrated torque amount; and
an assistance force control unit configured, in a case where the integrated torque amount calculated by the calculation unit is equal to or greater than an integration threshold corresponding to a travel condition of the vehicle, to reduce a steering assistance force of a direction preventing the vehicle from deviating from a lane to a value that is smaller than a predetermined value.

The assistance force control device may include a weight detection unit configured to detect a weight of the vehicle, in which the assistance force control unit increases the integration threshold as the vehicle is heavier in weight detected by the weight detection unit.

The assistance force control device may include a weight detection unit configured to detect a weight of the vehicle, in which the calculation unit multiplies the steering torque detected by the torque detection unit by a smaller coefficient as the vehicle is heavier in weight to calculate the integrated torque amount.

The assistance force control device may include a vehicle speed detection unit configured to detect a travel speed of the vehicle,
in which the assistance force control unit increases the integration threshold as the travel speed detected by the vehicle speed detection unit is higher.

The assistance force control device may include a vehicle speed detection unit configured to detect a travel speed of the vehicle,
in which the calculation unit multiplies the steering torque detected by the torque detection unit by a smaller coefficient as the travel speed of the vehicle is higher to calculate the integrated torque amount.

The assistance force control device may further include a position detection unit configured to detect a position of the vehicle,
in which in a case where a position of the vehicle detected by the position detection unit is within a predetermined distance from a lane demarcation line, the calculation unit starts integrating the steering torque of a direction bringing the vehicle close to the lane demarcation line positioned within the predetermined distance.

An assistance force control method according to a second aspect of the disclosure includes:
a step of detecting a steering torque of a vehicle;
a step of, after detecting a steering torque equal to or greater than a predetermined magnitude, integrating the steering torque to calculate an integrated torque amount; and
a step of, in a case where the integrated torque amount is equal to or greater than a first threshold corresponding to a travel condition of the vehicle, reducing a steering assistance force of a direction preventing the vehicle from deviating from a lane to a value that is smaller than a predetermined value,
in which a computer executes the steps.

Advantageous Effects of the Invention

According to the disclosure, it is possible to improve the accuracy of determining whether or not a driver is intentionally changing the lane.

DESCRIPTION OF EMBODIMENTS

[Outline of Assistance Force Control Device]

Figure 1:
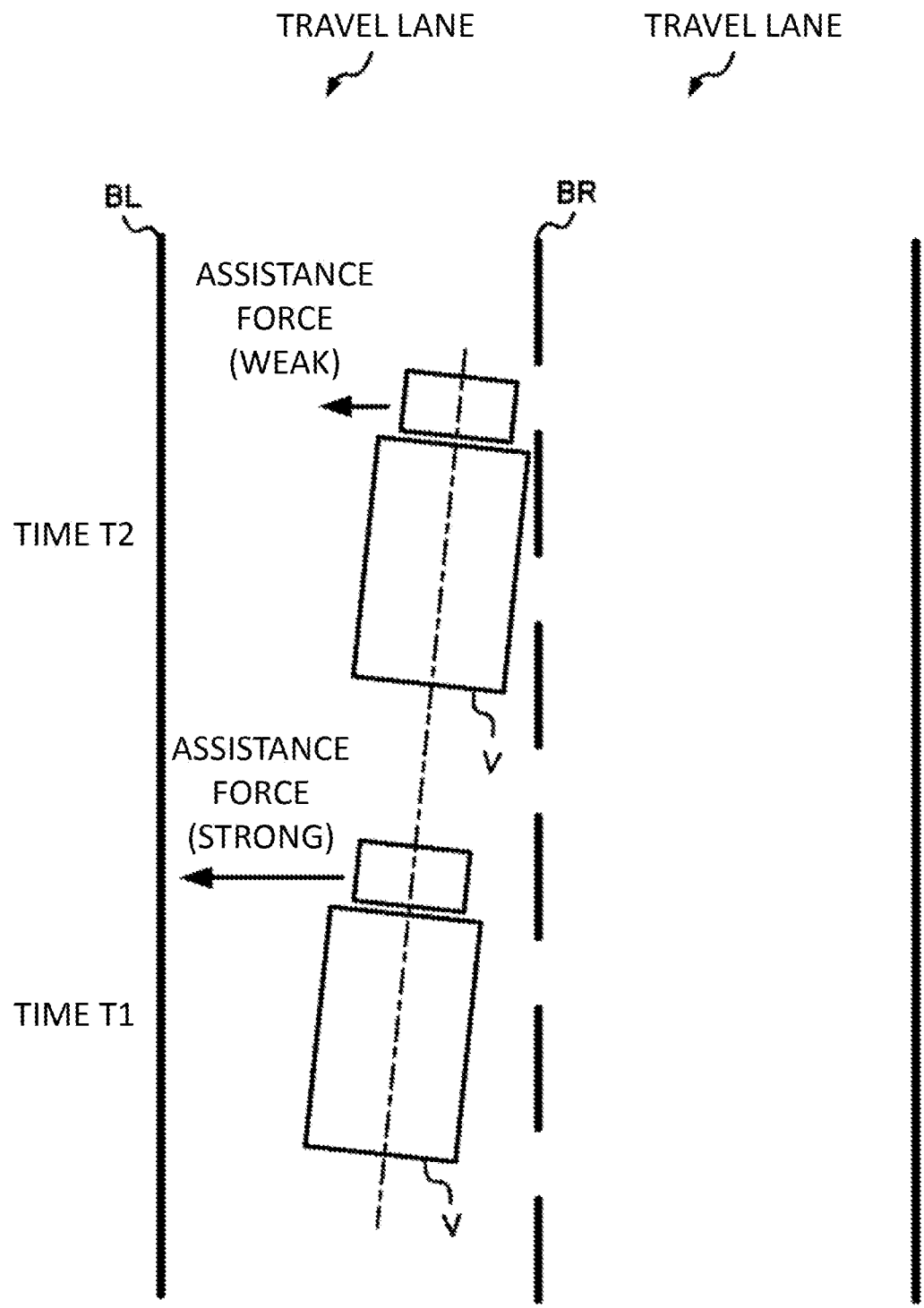
FIG. 1 is a diagram illustrating an outline of an assistance force control device according to the present embodiment.

FIG. 1 is a diagram illustrating an outline of an assistance force control device according to the present embodiment. FIG. 1 schematically shows a state in which a vehicle V traveling in a travel lane of a highway is viewed from above. At a time T1, the vehicle V is traveling rightward at a position slightly closer to the right of the lane. At a time T2 after time T1, the vehicle V is traveling at a position closer to a lane demarcation line BR than the position at the time T1.

When the vehicle V approaches the lane demarcation line, the assistance force control device mounted on the vehicle V generates a steering assistance force for turning the vehicle V away from the lane demarcation line in order to prevent the vehicle V from deviating from the lane. However, when detecting that the driver is intentionally changing the lane, the assistance force control device reduces the steering assistance force to a value that is equal to or smaller than a predetermined value (for example, zero).

The assistance force control device according to the present embodiment is characterized in that even in a case where the driver gradually moves toward an adjacent lane (for example, the overtaking lane in FIG. 1) with a weak steering force, it is possible to detect that the driver is intentionally changing the lane. For such purpose, the assistance force control device determines that the driver is intentionally changing the lane in a case where a value obtained by integrating the steering torque after detecting the steering torque equal to or greater than the predetermined magnitude becomes equal to or greater than a predetermined threshold value corresponding to a weight or a loading amount of the vehicle. By reducing the steering assistance force of the direction preventing the vehicle V from deviating from the lane to a value that is smaller than the predetermined value, the assistance force control device makes it easier for the driver to change the lane, and prevents an unstable state due to absence of steering assistance force after lane change.

Figure 2A:
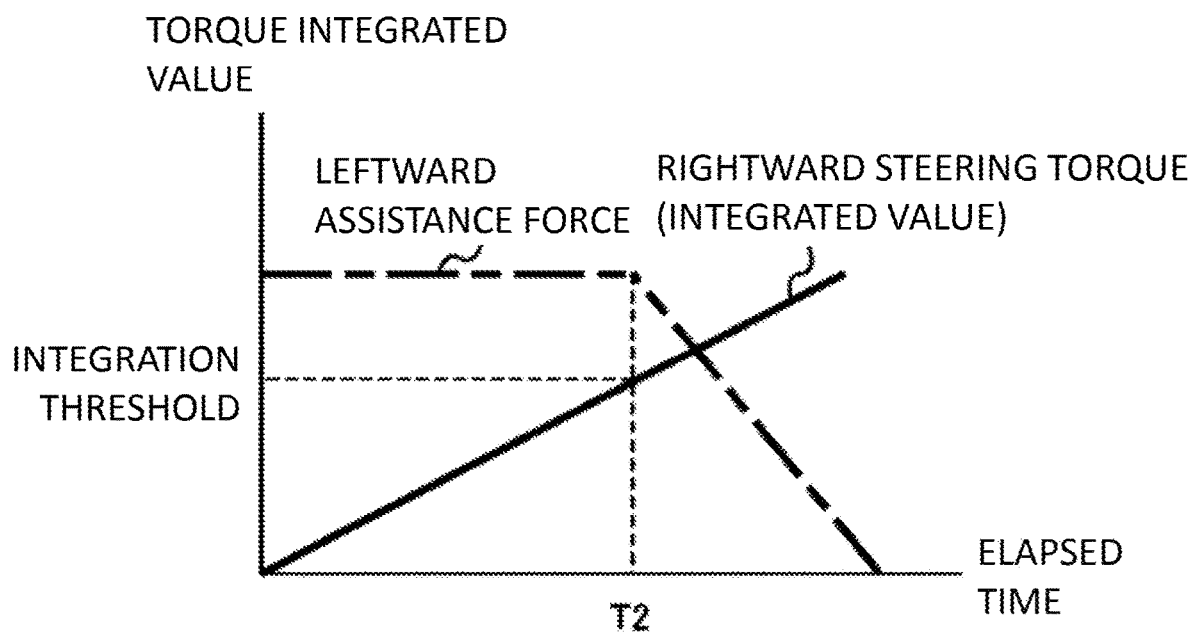
FIGS. 2A and 2B are diagrams showing a relationship between an elapsed time since the assistance force control device starts integrating a steering torque, an integrated value of the steering torque, and a steering assistance force.
Figure 2B:
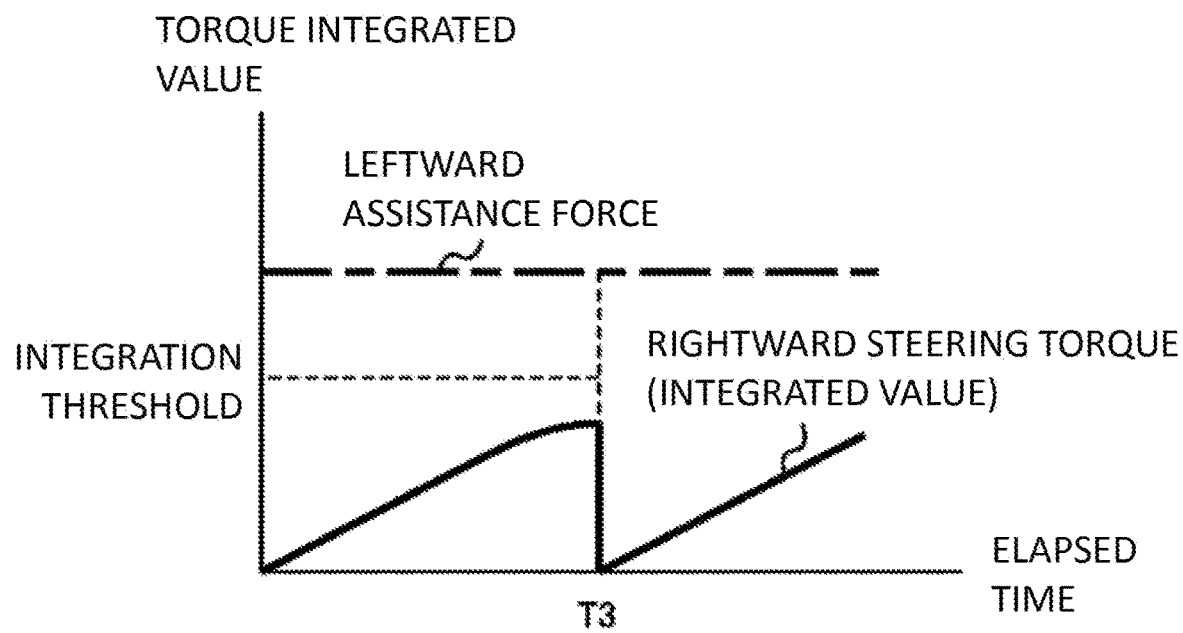

FIGS. 2A and 2B are diagrams showing a relationship between an elapsed time since the assistance force control device starts integrating the steering torque, an integrated value of the steering torque, and the steering assistance force. FIG. 2A shows a state in which the integrated value and the steering assistance force change over time in a case where the driver continues the rightward steering. In FIG. 2A, a time point when the position of the vehicle V reaches a predetermined position from the right-side lane demarcation line BR is defined as a starting point of the elapsed time.

In FIG. 2A, it can be seen that the integrated value of the steering torque increases with the lapse of time, and that a leftward steering assistance force starts to decrease at a time point (time T2) when the integrated value reaches a predetermined threshold (hereinafter referred to as an integration threshold). In this way, in a case where the driver is intentionally moving the vehicle V in the rightward direction, the assistance force control device gradually reduces the steering assistance force upon detecting the driver's intention, thereby improving operability of the driver. Further, since the steering assistance force does not decrease suddenly, it is possible to prevent the driver from excessively turning the steering wheel at a time point when the steering assistance force disappears.

FIG. 2B is a diagram illustrating a relationship between the elapsed time, the accumulated value, and the steering assistance force in a case where the rightward steering is stopped after the driver performs the rightward steering for a while. In FIG. 2B, the driver stops the rightward steering at a time point before the integrated value reaches the integration threshold, i.e., at a time T3 earlier than the time T2. In a case where the detected steering torque becomes equal to or smaller than a predetermined threshold, the assistance force control device stops the integration of the steering torque and initializes the integrated value. In this case, the assistance force control device determines that the driver is not intentionally moving the vehicle V rightward, and continues to generate a leftward assistance force.

Although the assistance force control device generates an assistance force of a constant magnitude until it is detected that the driver is intentionally moving the vehicle V rightward in FIGS. 2A and 2B, the magnitude of the assistance force does not have to be constant. For example, the assistance force control device may control the assistance force to increase as the vehicle V approaches the lane demarcation line BR.

Hereinafter, the configuration and operation of the assistance force control device will be described in detail.

[Configuration of Assist Force Control Device 1]

Figure 3:
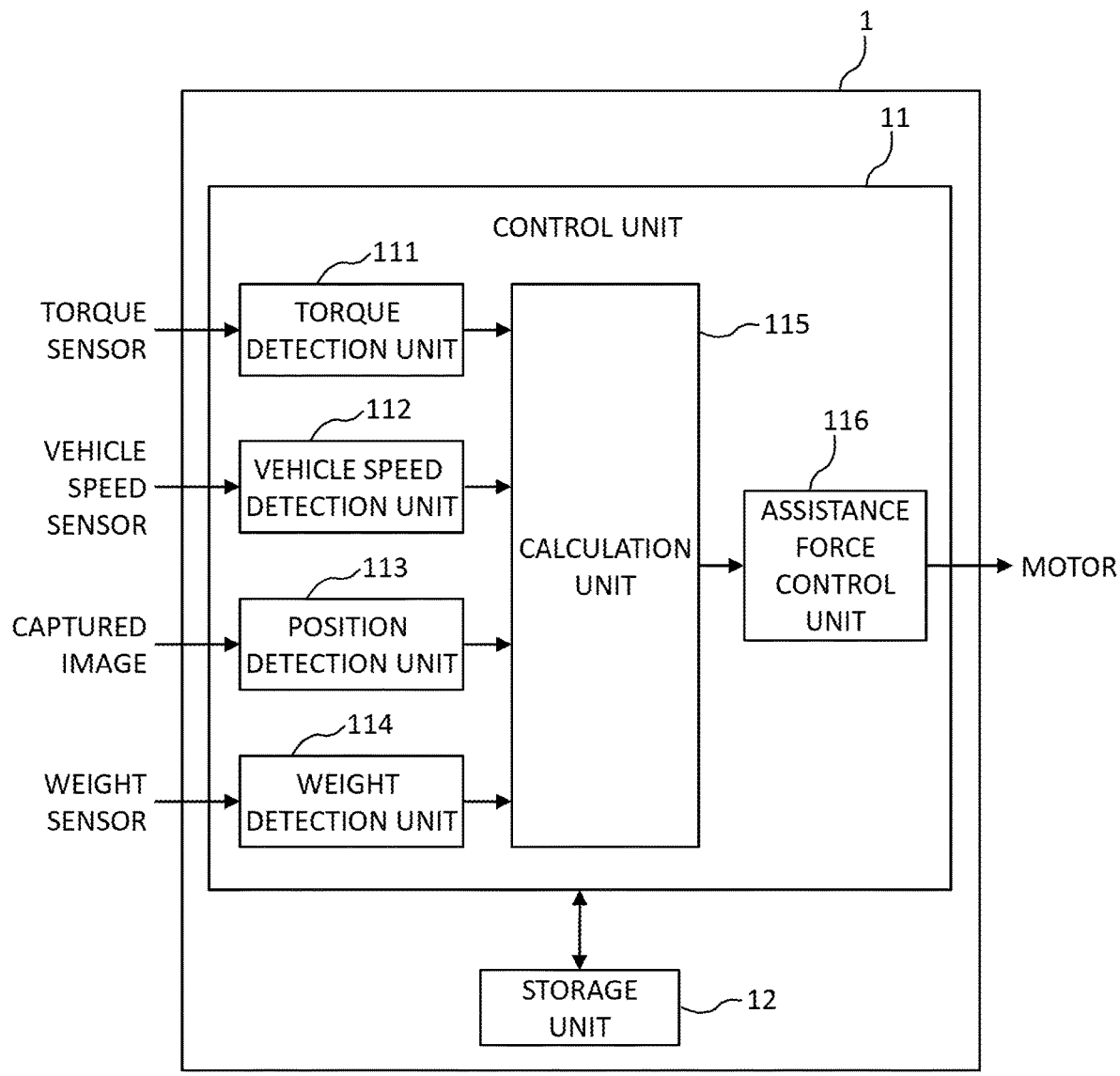
FIG. 3 shows a configuration of the assistance force control device.

FIG. 3 shows a configuration of the assistance force control device 1. The assistance force control device 1 includes a control unit 11 and a storage unit 12.

The control unit 11 is, for example, a central processing unit (CPU). The control unit 11 functions as a torque detection unit 111, a vehicle speed detection unit 112, a position detection unit 113, a weight detection unit 114, a calculation unit 115, and an assistance force control unit 116 by executing programs stored in the storage unit 12.

The storage unit 12 includes a storage medium such as a read only memory (ROM), a Random Access Memory (RAM), and a hard disk. The storage unit 12 stores programs executed by the control unit 11. In addition, the storage unit 12 stores the threshold value of the integrated value of the steering torque for the control unit 11 to determine that the driver is intentionally changing the lane.

The torque detection unit 111 detects the magnitude of the steering torque based on, for example, a signal input from a torque sensor provided on a steering. The torque detection unit 111 notifies the calculation unit 115 of the detected steering torque.

The vehicle speed detection unit 112 detects a travel speed of the vehicle V (hereinafter referred to as a vehicle speed) based on, for example, a signal input from a sensor detecting a rotation speed of a wheel. The vehicle speed detection unit 112 notifies the calculation unit 115 of the detected vehicle speed.

The position detection unit 113 detects the position of the vehicle V in the lane based on a captured image generated by imaging the front of the vehicle V by a camera mounted on the vehicle V. The position detecting unit 113 detects the position of the vehicle V with respect to the lane demarcation line, and notifies the calculation unit 115 of a distance between the lane demarcation line and the vehicle V.

The weight detection unit 114 detects a weight of the vehicle V based on a signal input from a weight sensor mounted on the vehicle V. The weight detection unit 114 may detect a weight value stored in the storage unit 12 in advance as the weight of the vehicle V. The weight detection unit 114 notifies the calculation unit 115 of the detected weight.

The calculation unit 115 integrates the steering torque to calculate an integrated torque amount after the torque detection unit 111 detects a steering torque equal to or greater than the predetermined magnitude. For example, when detecting a steering torque equal to or greater than a first threshold value determined based on a magnitude of a steering torque generated in a case where the driver is intending to change the lane at a vehicle speed detected by the vehicle speed detection unit 112, the calculation unit 115 starts integrating the steering torque. For example, the calculation unit 115 integrates the steering torque by adding the steering torque detected by the torque detection unit 111 for each predetermined unit time.

The calculation unit 115 may multiply the steering torque detected by the torque detection unit 111 by a smaller coefficient as the vehicle V is heavier in weight detected by the weight detection unit 114 to calculate the integrated torque amount. Although the steering torque required to move the vehicle V in the left-right direction increases when the vehicle V is heavy in weight, by changing the coefficient as described above, the calculation unit 115 can equalize the relationship between a movement amount of the vehicle V in the left-right direction and the integrated value of the steering torque without depending on the weight of the vehicle V.

Similarly, the calculation unit 115 may multiply the steering torque detected by the torque detection unit 111 by a smaller coefficient as the vehicle speed detected by the vehicle speed detection unit 112 is higher to calculate the integrated torque amount. Although the steering torque required to move the vehicle V in the left-right direction increases when the vehicle speed of the vehicle V is high, by changing the coefficient as described above, the calculation unit 115 can equalize the relationship between a movement amount of the vehicle V in the left-right direction and the integrated value of the steering torque without depending on the vehicle speed of the vehicle V.

In order to improve the accuracy of determining whether or not the driver is intending to change the lane, the calculation unit 115 initializes the integrated torque amount in a case where a steering torque of a direction bringing the vehicle V close to the lane demarcation line detected by the torque detection unit 111 is equal to or smaller than a second threshold value while the steering torque is integrated. For example, in a case where the driver stops moving rightward or turns the steering wheel to the left side while moving rightward, the calculation unit 115 determines that the driver does not intend to change the lane, and returns the steering torque amount to zero. The calculation unit 115 can prevent frequent repetition of start and stop of the integration by using the second threshold smaller than the first threshold value used when the integration of the steering torque is started.

For example, the calculation unit 115 determines the second threshold based on the travel condition of the vehicle such as the vehicle speed detected by the vehicle speed detection unit 112 or the weight detected by the weight detection unit 114. Since a larger steering torque is required to move in the left-right direction as the vehicle speed or the weight increases, the calculation unit 115 can determine that the driver does not intend to change the lane at an appropriate timing without depending on the vehicle speed or the weight, for example, by increasing the second threshold as the vehicle speed or the weight increases.

In a case where the position of the vehicle V detected by the position detection unit 113 is within a predetermined distance from the lane demarcation line, the calculation unit 115 may start integrating the steering torque of a direction bringing the vehicle V close to the lane demarcation line positioned within the predetermined distance. In this way, for example, since the steering torque generated in a state in which the vehicle V is traveling near a center of the lane and the driver does not intend to change the lane is not integrated, the assistance force control unit 116 can improve the accuracy of determining whether or not the driver intends to change the lane.

The assistance force control unit 116 causes an assistance force generation unit (not shown) to generate a steering assistance force of the direction preventing the vehicle V from deviating from the lane. The steering assistance force is a lane maintaining assistance force, and is generated by, for example, a motor included in the assistance force generation unit. In a case where the driver operates a winker to indicate the intention of lane change, the assistance force control unit 116 causes the assistance force generation unit to stop generating the steering assistance force.

In a case where the integrated torque amount calculated by the calculation unit 115 becomes equal to or greater than the predetermined integration threshold, the assistance force control unit 116 reduces the steering assistance force of the direction preventing the vehicle V from deviating from the lane to a value that is smaller than the predetermined value. In this way, the assistance force control unit 116 can detect that the driver intends to change the lane and can weaken the steering assistance force even in a case where the driver is to change the lane without operating the winker.

Here, the assistance force control unit 116 may determine the integration threshold based on the weight of the vehicle V detected by the weight detection unit 114. The assistance force control unit 116, for example, increases the integration threshold as the vehicle V is heavier in weight. In this way, the assistance force control unit 116 can reduce variation in time required for determining that the driver is changing the lane between a case where the loading amount of the vehicle V is large and the steering torque required for moving the vehicle V in the left-right direction is relatively large and a case where the loading amount is small and the steering torque is relatively small.

The assistance force control unit 116 may determine the integration threshold based on the vehicle speed detected by the vehicle speed detection unit 112. The assistance force control unit 116, for example, increases the integration threshold as the vehicle speed is higher. In this way, the assistance force control unit 116 can reduce variation in time required for determining that the driver is changing the lane between a case of traveling at a high speed where the steering torque required for moving the vehicle V in the left-right direction is relatively large and a case of traveling at a low speed where the steering torque is relatively small.

[Flowchart of Assistance Force Control Operation Performed by Assistance Force Control Device 1]

Figure 4:
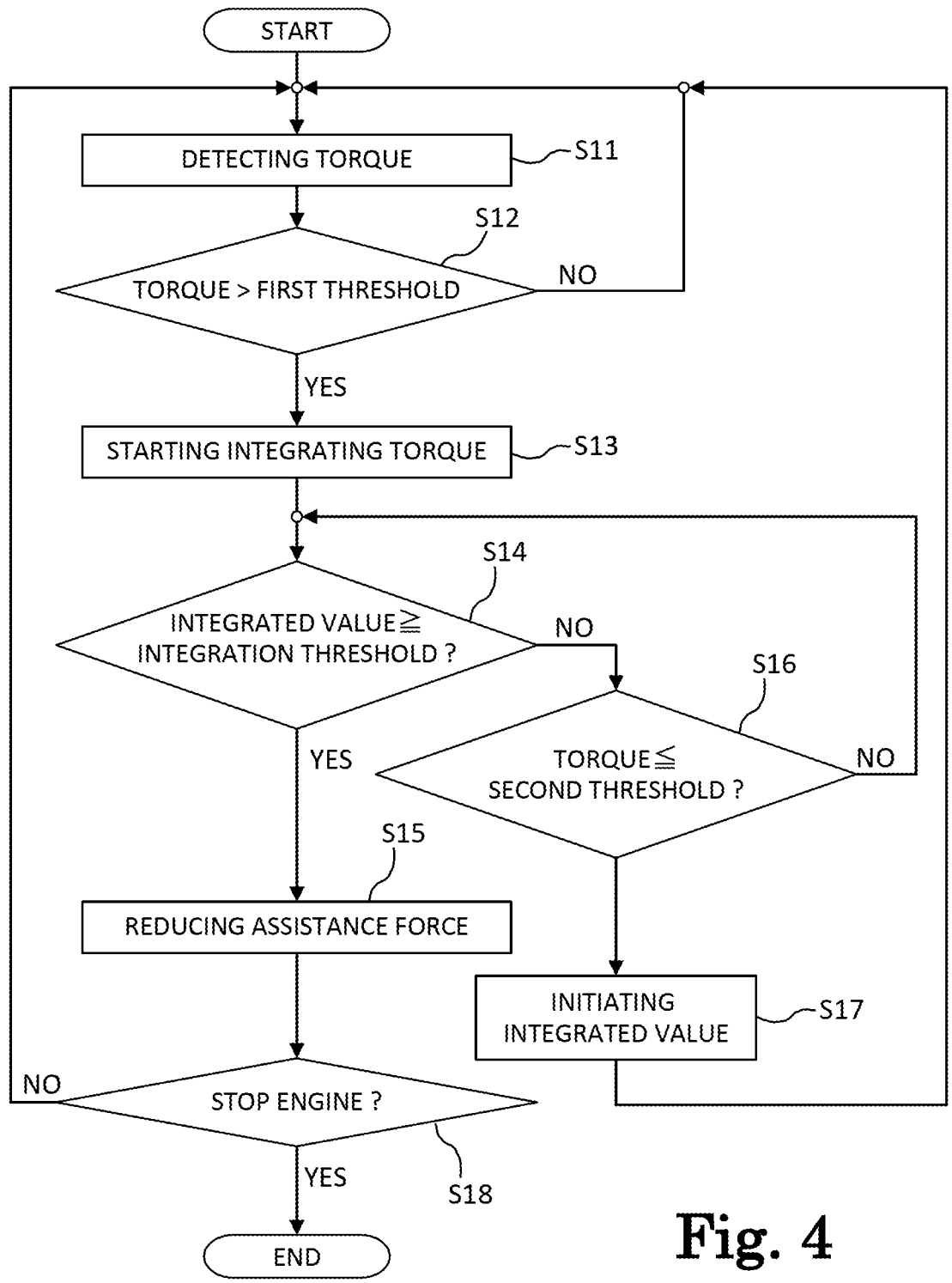
FIG. 4 is a flowchart of exemplary operation of determining whether a driver has an intention of lane change so as to control an assistance force.

FIG. 4 is a flowchart of exemplary operation of the assistance force control device 1 determining whether a driver has an intention of lane change so as to control an assistance force.

First, the torque detection unit 111 detects the steering torque at a predetermined interval (S11). In a case where the steering torque detected by the control unit 11 is larger than the first threshold (YES in S12), the calculation unit 115 starts integrating the steering torque (S13).

Subsequently, the assistance force control unit 116 monitors the integrated value of the steering torque (S14). In a case where it is determined that the integrated value is equal to or greater than the integration threshold (for example, the time T2 in FIG. 2A), the assistance force control unit 116 controls the motor generating the assistance force for assisting the lane maintaining assistance so as to reduce the assistance force. The assistance force control unit 116 may stop generation of the assistance force in a case where the integrated value becomes equal to or greater than the integration threshold.

In a case where the assistance force control unit 116 determines that the integrated value is smaller than the integration threshold in step S14, the calculation unit 115 checks whether or not the steering torque is equal to or smaller than the second threshold (S16). In a case where it is determined that the steering torque is equal to or smaller than the second threshold (YES in S16), the calculation unit 115 initializes the integrated value (S17) and the processing returns to step S11.

The assistance force control device 1 repeats the processing from step S11 to step S17 until the engine stops (YES in step S18). In this way, even in a case where the driver gradually changes the position of the vehicle V in the left-right direction, the assistance force control device 1 can determine whether or not the driver intends to change the lane at a high accuracy, and can reduce or stop the assistance force for the lane maintaining assistance at an appropriate timing.

MODIFIED EXAMPLE

Although the above has described an example in which the assistance force control unit 116 changes the integration threshold for determining that the driver is intentionally changing the lane depending on the weight or the vehicle speed of the vehicle V, the assistance force control unit 116 may also change the integration threshold depending on the position at which the calculation unit 115 starts integration. For example, the assistance force control unit 116 may increase the integration threshold as the distance between the position at which the calculation unit 115 starts integration and the lane partition line is longer.

[Effects of Assistance Force Control Device 1]

As described above, in the assistance force control device 1 of the present embodiment, the torque detection unit 111 detects the steering torque equal to or greater than the predetermined magnitude, and then the calculation unit 115 integrates the steering torque to calculate the integrated torque amount. In a case where the integrated torque amount calculated by the calculation unit 115 becomes equal to or greater than the integration threshold corresponding to the travel condition of the vehicle (for example, the weight or the vehicle speed of the vehicle V), the assistance force control unit 116 reduce the steering assistance force of the direction preventing the vehicle V from deviating from the lane to a value that is smaller than the predetermined value. In this way, the assistance force control device 1 can determine whether or not the driver is intentionally changing the lane even in a case where the driver gradually moves the vehicle V with a weak steering torque. As a result, it is possible to improve the accuracy of determining whether or not the driver is intentionally changing the lane.

Although the description is made by using the embodiments of the present invention, the technical scope of the present invention is not limited to the above described embodiments. It is apparent to persons skilled in the art that various modifications and improvements can be applied to the above-described embodiments. It is also apparent from the scope of the claims that the embodiments applied with such modifications or improvements can be included in the technical scope of the present invention.

This application is based on the Japanese Patent Application No. 2016-152057, filed Aug. 2, 2016, the contents of which are incorporated herein by reference.

INDUSTRIAL APPLICABILITY

The technique of the disclosure is useful to improve the accuracy of determining whether or not a driver is intentionally changing the lane.

LIST OF REFERENCE NUMERALS

1 Assistance force control device
11 Control unit
12 Storage unit
111 Torque detection unit
112 Vehicle speed detection unit
113 Position detection unit
114 Weight detection unit
115 Calculation unit
116 Assistance force control unit

The invention claimed is:

1. An assistance force control device comprising:
   a storage medium configured to store a program; and
   a central processing unit (CPU) coupled to the storage medium and configured to execute the program stored in the storage medium to:
   detect a steering torque of a vehicle;
   after detecting a steering torque equal to or greater than a predetermined magnitude, integrate the steering torque to calculate an integrated torque amount;
   in a case where the integrated torque amount is equal to or greater than an integration threshold corresponding to a travel condition of the vehicle, reduce a steering assistance force of a direction preventing the vehicle from deviating from a lane to a value that is smaller than a predetermined value;
   detect a position of the vehicle; and
   in a case where a detected position of the vehicle is within a predetermined distance from a lane demarcation line, start integrating the steering torque of a direction bringing the vehicle close to the lane demarcation line positioned within the predetermined distance.

2. The assistance force control device according to claim wherein the CPU is further configured to:
   detect a weight of the vehicle; and
   increase the integration threshold as the detected weight of the vehicle increases.

3. The assistance force control device according to claim 1, wherein the CPU is further configured to:
   detect a weight of the vehicle; and
   multiply the detected steering torque by a coefficient that is decreased as the detected weight of the vehicle increases to calculate the integrated torque amount.

4. The assistance force control device according to claim 1, wherein the CPU is further configured to:
   detect a travel speed of the vehicle; and
   increase the integration threshold as the detected travel speed increases.

5. The assistance force control device according to claim 1, wherein the CPU is further configured to:

detect a travel speed of the vehicle; and
multiply the detected steering torque by a coefficient that is decreased as the detected travel speed of the vehicle increases to calculate the integrated torque amount.

6. An assistance force control method comprising:

a step of detecting a steering torque of a vehicle;

a step of, after detecting a steering torque equal to or greater than a predetermined magnitude, integrating the steering torque to calculate an integrated torque amount;

a step of, in a case where the integrated torque amount is equal to or greater than a first threshold corresponding to a travel condition of the vehicle, reducing a steering assistance force of a direction preventing the vehicle from deviating from a lane to a value that is smaller than a predetermined value;

a step of detecting a position of the vehicle, and a step of, in a case where a detected position of the vehicle is within a predetermined distance from a lane demarcation line, starting integration of the steering torque of a direction bringing the vehicle close to the lane demarcation line positioned within the predetermined distance, wherein a computer executes the steps.

\* \* \* \* \*